US006692786B1

(12) United States Patent
Denk et al.

(10) Patent No.: US 6,692,786 B1
(45) Date of Patent: *Feb. 17, 2004

(54) BEER CLARIFICATION PROCESS BY CROSSFLOW MICROFILTRATION

(75) Inventors: Viktor Denk, Kranzberg (DE); Ulrich Gans, St. Gallen (CH)

(73) Assignee: Wissenschaftsforderung der Deutschen Brauwirtschaft e.V., Bonn (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 855 days.

(21) Appl. No.: 08/929,108

(22) Filed: Sep. 15, 1997

Related U.S. Application Data (63) Continuation of application No. 08/522,340, filed as application No. PCT/EP95/00198 on Jan. 19, 1995, now abandoned.

(30) Foreign Application Priority Data

Jan. 19, 1994 (DE) .......................... 44 01 456

(51) Int. Cl.$^7$ ............................... C12H 1/07
(52) U.S. Cl. ............... 426/330.4; 426/330.3; 426/590; 426/592; 426/495
(58) Field of Search ............... 420/330.4, 330.3, 420/590, 592, 495

(56) References Cited

U.S. PATENT DOCUMENTS 4,844,932 A * 7/1989 Daoud ................ 426/489

FOREIGN PATENT DOCUMENTS

DE    3936797    * 5/1991
EP    0 351 363    1/1990
EP    0 427 376    5/1991

OTHER PUBLICATIONS

Müller, W., MBAA Technical Quarterly, vol. 29, pp 42–47, 1992.*
Volk, et al, Inst. of Brewing, Central and South African Section, 1993, pp 125–34.*
Muller, W.K., Tungential Flow Filtration of Yeast for Beer Recovery, NR 29, 1991, pp. 1260–1263.*
Gans et al., Economical Crossflow Microfiltration of Beer, Brauwelt, No. 40, 1994 pp 2000–14.*
Bierfiltration Mittels Cross Flow Systemen—Gerd W. Steinhoff Noch Im Versuchstadium—Brewing Industry—pp. 748–750.
Einsatz von Cross–flow–Techniken in der Bioverfahrenstechnik—Tillmann Faust und Michael H. Kopf—Chemie Ingenieru Technik—Juni 1989 Seite 443–512 pp. 459–468.
Das vorliegende Werk wurde sorgfaltig erarbeitet. Dennoch ubernehmen Autor und Verlag fur die Richtigkeit von Angaben, Hinweisen und Ratschlagen sowie fur eventuelle Druckfehler keine Haftung.—Dr. Seigfried Ripperger.

* cited by examiner

*Primary Examiner*—Curtis E. Sherrer
(74) *Attorney, Agent, or Firm*—Shoemaker and Mattare (57) ABSTRACT

The invention relates to a process for the crossflow microfiltration of beer. In order to prevent the clogging of the membrane of the filter module by components of the non-clarified beer which are to be filtered out and settle in the form of a covering, the filtration is interrupted at intervals. In a subsequent brief pause the covering on the membrane is chemically and partially dissolved with a caustic solution whereafter the covering is subsequently removed by backwashing of the membrane with water. In order to further improve the filtration, the transmembrane pressure (p) is regulated during the filtration phase according to a substantially periodic time function, and the crossflow velocity (v) of the beer over the membrane is increased substantially continuously.

8 Claims, 6 Drawing Sheets

BEER CLARIFICATION PROCESS BY CROSSFLOW MICROFILTRATION

"This application is a continuation of application Ser. No. 08/522340 filed Sep. 14, 1995 now abandoned, which is a 371 of PCT/EP95/00198, filed Jan. 19, 1995."

BACKGROUND

The intention is that due to the filtration of beer yeast and other sources of turbidity as well as colloidally dissolved substances, in particular albumens are to be removed in order to afford to the beer a clear non-glossy appearance and to increase the chemical physical as well as biological shelf life.

Apart from kieselgur filtration, until now used most frequently, attempts are being made to employ other filtration processes particularly having regard to the cost-intensive disposal of the kieselgur sludges. Such a process is the cross flow microfiltration in which the unclarified or preclarified beer in a filter unit flows over a porous membrane whereby between the crossflow or non-filtrate side and the opposite filtrate side of the membrane a-transmembrane pressure is set up whereby part of the beer flowing over the membrane penetrates the latter in transverse direction and is collected on the filtrate side as a purified filtrate. During this filtration the components to be filtered off precipitate on the membrane surface on the non-filtrate side, partly as a coating. To ensure the penetration of the membrane during the entire filtration process, this coating must not become too compact.

From EP 0 351 363 A1 the cross flow microfiltration of beer is known wherein the beer simultaneously during the filtration is stabilised by means of a stabilising agent, preferably PVPP. In order to avoid premature clogging of the membrane pores, a granular or fibrous filtration aid is additionally admixed to the beer to be filtered and settles on the membrane for the purpose of preventing clogging of the membrane pores due to the turbidity sources, etc. Kieselgur or perlite may, for example, be used as such filtration aid.

Although it is possible in this manner to prevent the particulate components of the beer from clogging the membrane pores, it is not possible by means of this process to intercept the colloidal substances, in particular albumens by means of the filtration aid. These colloidally dissolved components at the low temperatures required for the beer filtration of about 0° C. form a gel or jelly-like mass which permeates the covering layer and unavoidably clogs the membrane pores. As a result the effectiveness of the filtration is relatively rapidly reduced. For that reason provision is made, according to the aforesaid European patent application, to clean the membrane after concluding the filtration process. This may be attained by rinsing, increasing or reversing the crossflow velocity or by backwashing, in that a certain amount of filtrate is forced from the filtrate side through the membrane onto the non-filtrate side. The periodic membrane cleaning proceeds more particularly by rinsing, whereby the covering layer is initially partially coarsely removed, and by means of subsequent rinsing with hot caustic liquor and a sterilisation is cleaned and regenerated simultaneously with the PVPP being used in the plant as a stabiliser. However, the cost of this cleaning is relatively high and time-consuming and reduces the effectiveness of the filtration.

From EP 0 427 376 A2 a Cross flow microfiltration plant is known in which the feed pump is installed in a diagonal branch of a ducting loop comprising four branches, a closure valve being provided in each of the branches of the loop. At the branch points to which the pump is connected, the inlet from a feed tank or the return duct to the feed tank is connected whereas the two remaining branch points are connected to the two ends of the filter module. By opening and closing of appropriate valves it is possible with this filtration plant to reverse the crossflow direction of the liquid over the membrane. In addition, it is possible by appropriate settings of the valves to draw liquid from the filtrate side through the membrane in order to thereby more or less break down the coating. However, this succeeds only partially since during the filtration of beer the membrane pores also become clogged by the gel or jelly-like colloidally dissolved substances which in contrast to other particles of the covering layer cannot be removed readily by backwashing; rather, the liquor drawn through the membrane will select the way of least resistance, that is to say will flow through the membrane only wherever the membrane is locally pervious. Complete cleaning of the membrane is not possible by such a process.

A so-called integrated backwashing of the membrane is also known wherein the transmembrane pressure across the membrane is adjusted, for example by throttling the filtrate discharge, in such a manner that part of the membrane, e.g. that half which in the direction of flow is rearmost is permeated by the filtrate from the filtrate to the non-filtrate side, resulting likewise in a portion of the covering layer present there to be removed; cf. S Ripperger, *Mikrofiltration mit Membranen*, Verlag Chemie, Weinheim, 1992, page 133.

It has furthermore been proposed to employ a plurality of measures for the control of the covering layer, for example the just mentioned integrated backwashing and in addition thereto during a brief interruption of the filtration, the backwashing and regeneration of the membrane with hot water and the reversal of the crossflow direction; cf. G W Steinhoff, *Brauindustrie* 7/89, pages 748 to 750, in particular page 750, right hand column, section "Verschiedene Ger ätegröβen"("different sizes of apparatus").

In particular, the back pressing of filtrate through the membrane also entails problems, in particular due to the covering layer being released thereby only incompletely from the membrane surface. Because as aforementioned, the covering layer is primarily released wherever it offers the least flow resistance to the backwashing process, those parts of the membrane surface which carry a thick covering layer are "disadvantaged by the backwashing" as explained in detail by T Faust et al., in *Chem.-Ing.-Tech.* 61, 1989, No. 6, pages 459 to 468, in particular page 466.

In all the known processes, the effectiveness of the filtration diminishes with time so that it has not yet been possible to employ the cross flow microfiltration process economically for the clarification of beer. In addition, as the effectiveness of the filtration diminishes due to the growing covering layer, the flow velocities and the pressure across the membrane must be set to very high values in order to attain at all filtration effects which are still acceptable, so that the energy requirements become very high. Due to the reduced filter effectiveness the life expectancies of the membrane filters used are likewise reduced.

In the German patent application P 42 27 225.4 (which is not a prior publication), a plurality of measures have been proposed to prevent or reduce the clogging of the membrane by the ingredients of the beer to be filtered. Inter alia it was there proposed to control the transmembrane pressure and the crossflow velocity of the beer across the surface of the membrane as functions of time, a lower transmembrane pressure and a high flow velocity being set up at the beginning of the filtration and these values being varied in the course of the filtration in relation to a rising transmembrane pressure and a decreasing crossflow velocity. In addition, the filtration is to be briefly interrupted at intervals and the membrane is to be subjected to backwashing, preferably with water during these interruptions. Although it was possible to improve the filtration results by these expedients, the long-term effectiveness of the filtration nevertheless diminished here as well.

SUMMARY OF THE INVENTION

It is a purpose of the invention to create a process for the clarification of beer by means of cross flow microfiltration in which high flux rates can be attained over long filtration periods with simultaneous relatively low energy requirements.

This purpose is fulfilled according to the invention by the features set out in the characterising part of patent claim 1.

Further embodiments of the invention are apparent from the subsidiary claims.

An essential feature of the invention is the chemical and partial dissolving of the covering layer, preferably with 0,2to 5% caustic soda. For this purpose only a small amount of caustic soda is necessary because the covering and in particular the colloidally dissolved substances are merely subjected to incipient dissolution and need not be removed by the caustic liquor. The complete removal of the partly dissolved covering layer proceeds essentially purely mechanically by the subsequent backwashing of the membrane preferably with water, whereby the covering layer is lifted off.

Preferably, for cleansing, the filter on the filtrate side is filled with the caustic liquor which is then forced through the membrane towards the non-filtrate side preferably with the aid of water serving as rinsing agent.

Moreover, the caustic liquor can be employed at low temperature, e.g. room temperature.

It was furthermore found that the effectiveness of the filtration can be further increased in that the transmembrane pressure according to a time function is so controlled that at certain time intervals an integrated backwash with filtrate is brought about.

The time function for controlling the membrane pressure is preferably an essentially periodical, e.g. sinusoidal, triangular or sawtooth-like function. The filtration commences at a transmembrane pressure intermediate between a minimum and a maximum, a flow through the membrane over substantially its entire surface being ensured without return flow from the filtrate to the non-filtrate side. After having attained the maximum transmembrane pressure, the pressure is again regulated in the direction towards a minimum, an integrated backwashing of the membrane with filtrate from the filtrate side to the non-filtrate side being set up at a certain pressure value, and continued until such time that the transmembrane pressure, after having passed through the minimum, once again attains an appropriate value at which the membrane is permeated entirely from the non-filtrate to the filtrate side. The overall filtration effect can be improved if, after termination of the integrated backwashing, the direction of flow of the beer flowing over the membrane is reversed. The beer will then first flow over that region of the membrane which due to the integrated backwash has been cleaned at least in part so that a high flux rate is set up there. This reversal of the flow direction should be effected after each integrated backwash.

It was found to be advantageous to control in addition to the control of the transmembrane pressure, also the crossflow velocity of the non-filtrate across the membrane, more particularly such that after the commencement of the filtration the crossflow velocity is increased substantially continuously. Accordingly, the filtration process is commenced at a relatively low crossflow velocity, said velocity then being gradually raised. This expedient has also an energy related justification: at an initially relatively low crossflow velocity a high adequate flux rate is attained because the membrane is still clean, whereas subsequently due to the increasing flow velocity the particles which settle on the membrane are at least partially carried away by the non-filtrate which rapidly flows thereover so that an excessive thickness of the covering layer is avoided.

Even if a reversal of the flow direction of the beer is carried out between the commencement of the filtration and the cleaning and rinsing phase, the absolute value of the crossflow velocity in the new direction is to be set approximately to the final value of the preceding crossflow phase, so that the absolute value of the crossflow velocity between the beginning of the filtration and the cleaning and washing phase is raised substantially continuously.

This raising of the crossflow velocity can be performed for each filtration phase between any two cleaning and washing phases; however, it is also possible to perform the velocity control solely during the initial phase of a filtration and then to maintain the crossflow velocity for the remainder of the filtration duration at an approximately constant elevated level.

BRIEF DESCRIPTION OF THE DRAWINGS

The invention will be further explained in the working examples with reference to the drawings, namely.

DESCRIPTION OF THE PREFERRED EMBODIMENTS

Figure 1:
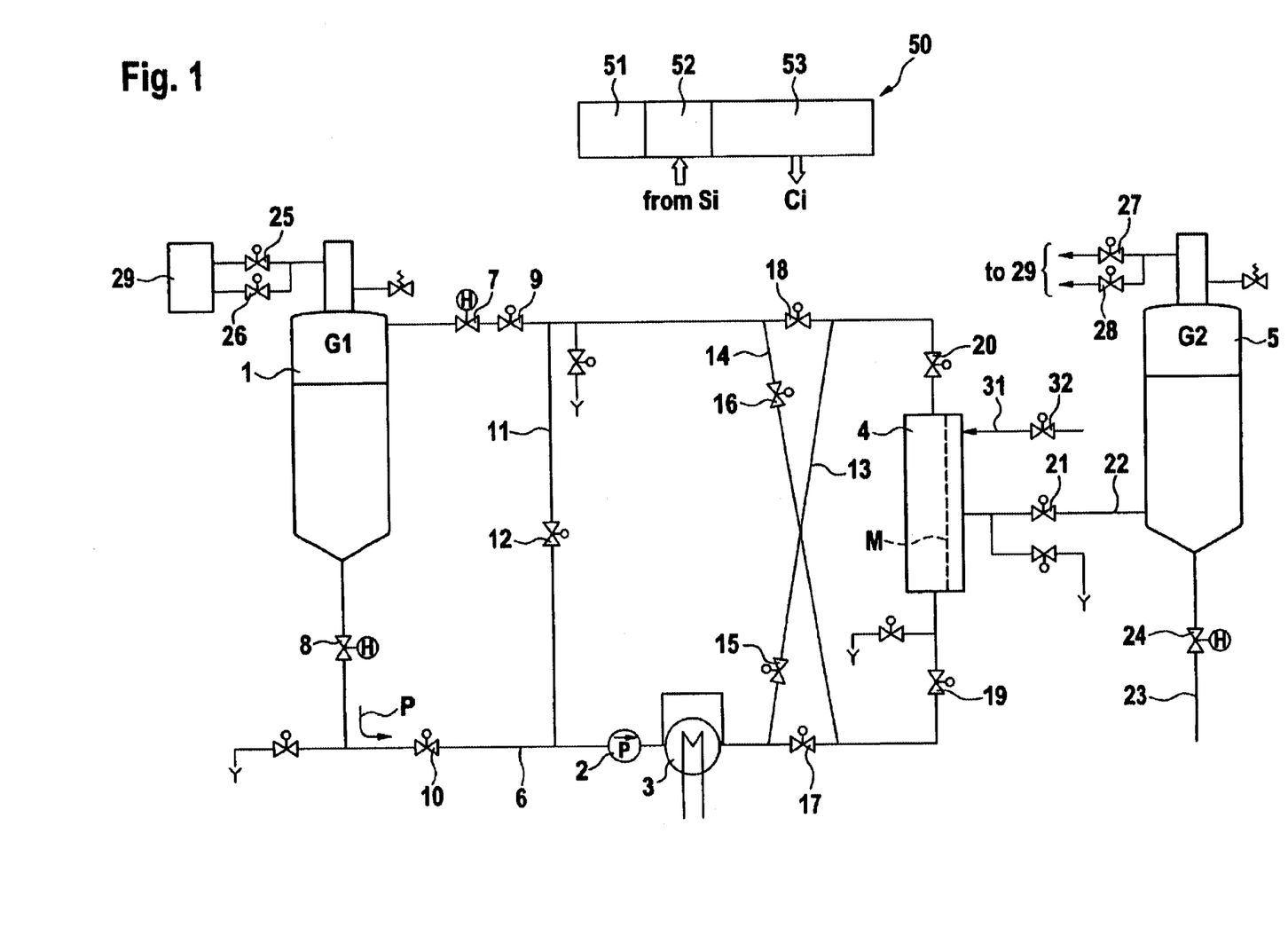
FIG. 1 a schematic diagram of an installation for clarifying beer by means of cross flow microfiltration according to the invention.
Figure 2:
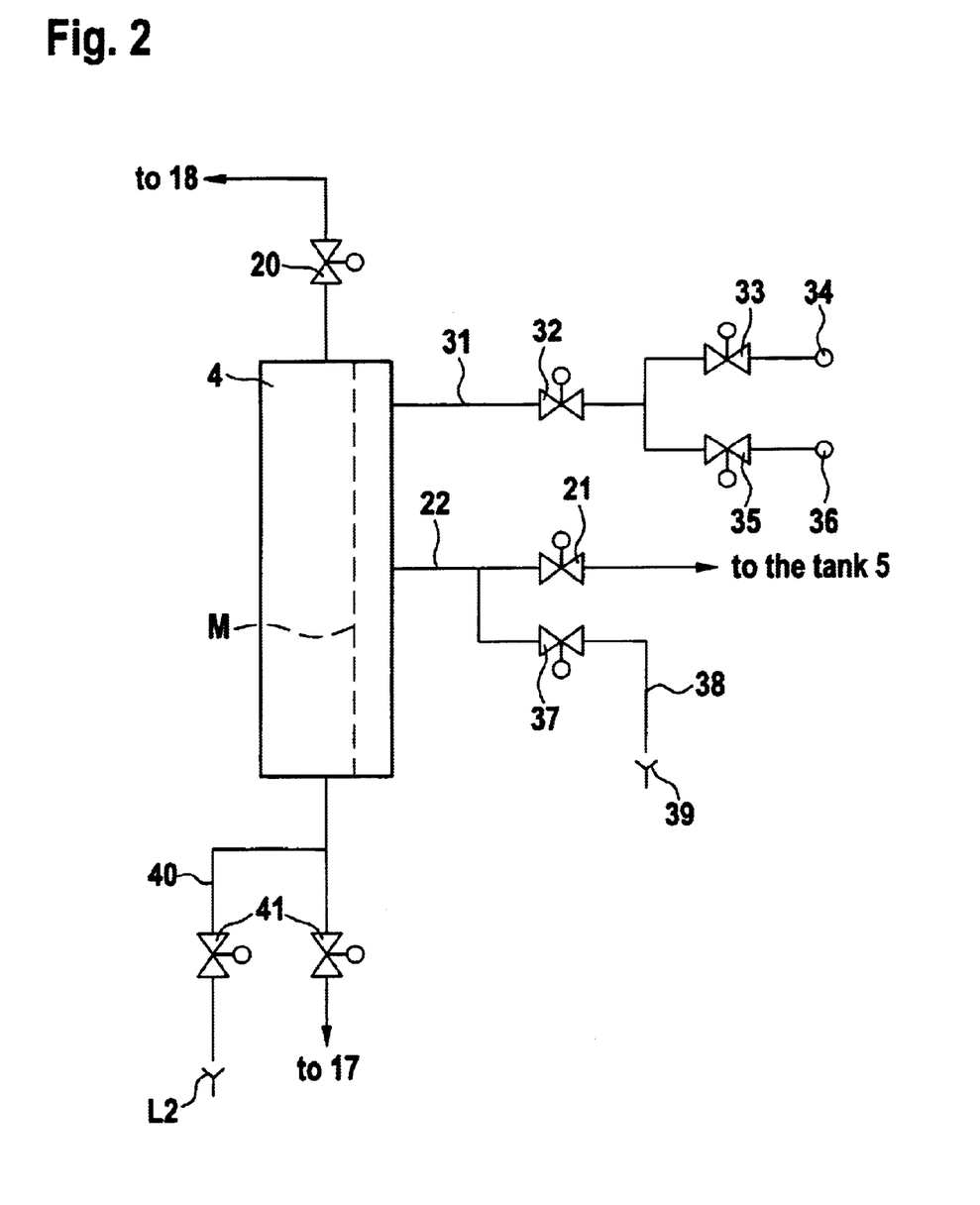
FIG. 2 a schematic representation of a cross flow filter used including its connections.

The filtration plant according to FIG. 1 includes a storage tank 1 for the beer to be clarified, i.e. the non-filtrate, furthermore a conveyance pump 2 a heat exchanger 3, a filter module 4 and a collecting tank 5 for the filtered beer. All elements are interconnected by a duct system 6 in order to permit a circulation of the beer between the storage tank, the conveyance pump, heat exchanger and module. The amount of beer being circulated may be adjusted by two throttle valves 7 and 8 at the inlet and outlet of the storage tank. Each throttle valve 7 and 8 respectively is furthermore associated with a closure valve 9 and 10 respectively in downstream and upstream direction. In the plant according to FIG. 1 the beer to be clarified flows counter-clockwise through the duct system 6 as indicated by the arrow P.

Between the two closure valves 9 and 10 a further transverse duct 11 is provided including a closure valve 12, which likewise serves for regulating the circulation within the duct system. The aforesaid throttle valves and closure valves can be so adjusted that the beer in its circulation through the duct system 6 flows either totally or only partly or at least during certain periods not at all through the storage tank 1.

In the duct system two further transverse ducts 13 and 14 are also provided which extend between the outlet of the heat exchanger 3 and that of the filter module and in each of which a valve 15 or 16 respectively is provided. A valve 13 or 18 is in each case provided between the branching off locality of the transverse duct 13 and the inlet of the filter module 14, as well as between the outlet of the filter module 4 and the branching off point of the transverse duct 14. By means of the transverse ducts 13 and 14 and the valves 15 to 18 the flow direction in the filter module may be reversed and quite generally the circulation of the beer in the duct system 6 may be influenced.

The inlet and outlet of the filter module 4 are likewise each provided with a closure valve 19 and 20 respectively.

A duct 22 adapted to be closed by a valve 21 branches off the filter module 4 and leads to the collecting tank 5 from which the beer may be withdrawn by way of a withdrawal duct 23 and a valve 24.

In addition to the storage tank 1 and the collecting tank 5, a gas tank 29 is also provided by way of two valves 25, 26 respectively 27 and 28 with appropriate pump and suction means serving to establish a gas cushion G1 or G2 respectively above the non-filtered beer in the feed tank 1 or the filtered beer in the collecting tank 5.

The filter module 4 is shown in the figure only very schematically as a block including a membrane arrangement M indicated in broken lines. Conventionally such a filter unit comprises a plurality of for example tubular filter modules having an internal concentric membrane through which the beer to be filtered flows.

A further duct 31 adapted to be blocked by means of a valve 32 enters into the filtrate side of the filter module 4. Downstream of the valve 32 the duct branches, one branch leading by way of a valve 33 to a connection 34 for the feeding of caustic soda and the other branch leading by way of a valve 35 to a water connection 36.

Upstream of the valve 21 a further duct 38, closable by a valve 37 branches off from the duct 22 and by way of a discharge means 39 leads to a caustic liquor recovery vessel that is not illustrated.

Between the filter module 4 and the valve 19 a further duct 40 branches off which by way of a valve 41 leads into a drain 42 or the aforesaid caustic liquid recovery vessel.

Moreover, a plurality of sensors, more specifically the sensors S1 to S10, are provided by means of which, depending on function, the pressure in the system, the temperature of the beer, the through-flow rate etc. are measured.

The described plant is controlled with the aid of a control and regulating installation 50 which is composed, for example of a programme unit 51, an input and evaluation unit 52 and the actual control means 53. The desired process parameters can be inputted by way of the input unit 52; in addition, the signals of the sensors are fed into this unit so that where required the programme fixed in the programme unit 51 can be interacted with for the control of the entire plant. Control signals Ci are then issued by the control unit 53 to the individual elements of the plant, in particular to the aforesaid valves required for the control, the pump 2 and the heat exchanger 3.

Figure 3:
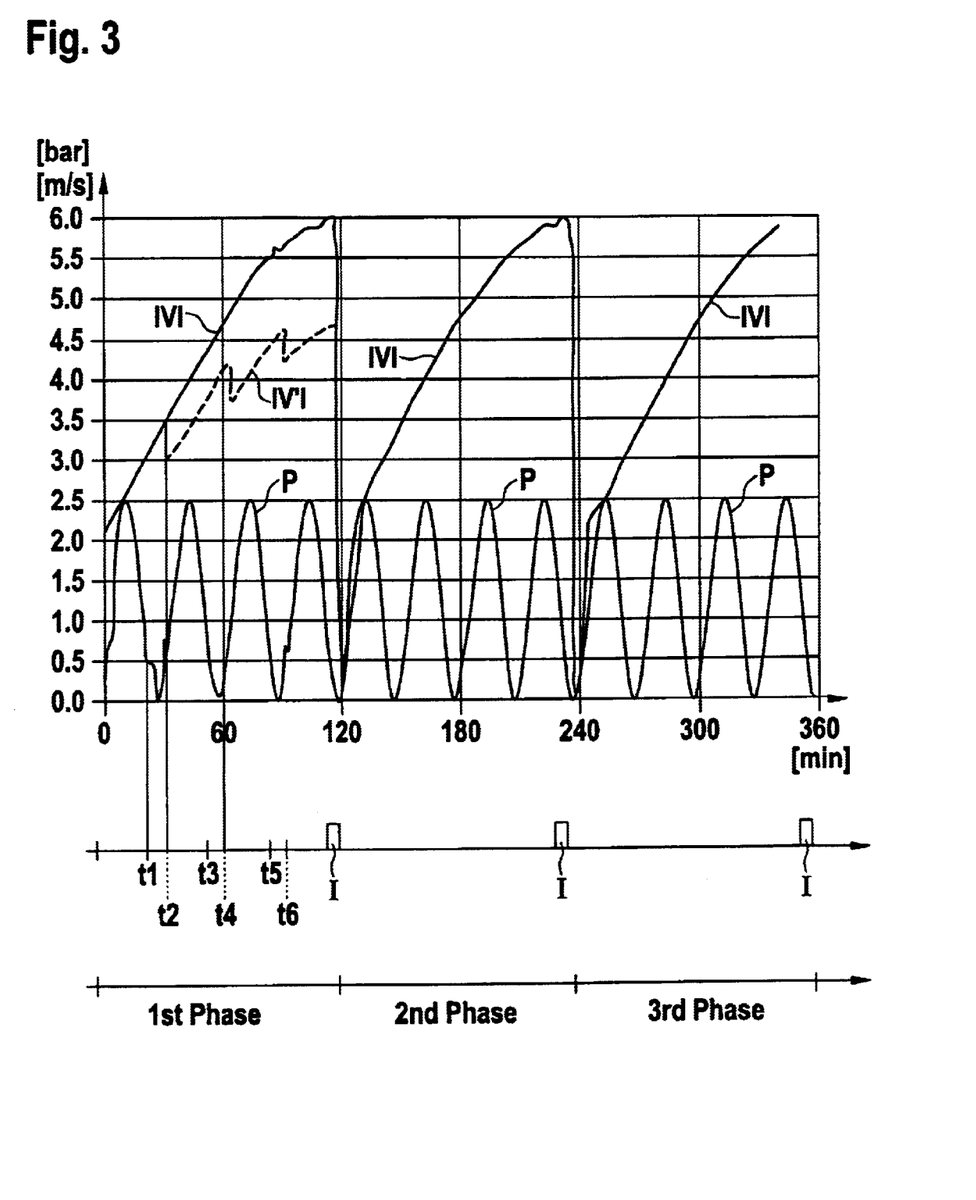
FIG. 3 a graph for explaining the control of the transmembrane pressure and the crossflow velocity of the beer over the membrane of a filter module.

In FIG. 3 the pattern of transmembrane pressure p as well as the absolute amount of the flow velocity v for a filtration process having a pluraliy of filtration phases is plotted against time t in minutes.

The pattern of the transmembrane pressure p follows a sinus-like function having a period duration of about 30 minutes, each filtration phase in this experiment lasting 120 minutes. At the commencement of the first filtration phase, the transmembrane pressure is rapidly raised to about 0,5 bar so that the membrane is permeated over its entire surface area by the unfiltered beer. Thereafter, the transmembrane pressure is increased and after having attained the first maximum at about 2,5 bar is lowered again, this pressure control being brought about by a corresponding control of the gas cushions G1 and G2. Approximately at time t1 the pressure attains such a low value that the aforementioned integrated backwash of the membrane M now commences. On attaining the minimum value of about 0 bar, approximately one half of the membrane surface area is permeated by filtrate from the filtrate side towards the non-filtrate side. After having passed through the minimum, the pressure is raised once again and approximately at time t2 attains a value approximately corresponding to the initial value so that the integrated backwashing of the membrane M is terminated and the latter is once again permeated over its entire surface area from the non-filtrate side to the filtrate side.

This pattern is now repeated so that these integrated backwash phases are brought about, in each case between the times t3 and t4 as well as t5 and t6.

In addition, after each integrated backwash phase, i.e. at the times t2, t4 and t6, the flow direction of the beer across the membrane is reversed such that the absolute value of the crossflow velocity prevailing prior to the reversal of the direction of flow is reattained as rapidly as possible as illustrated by the solidly drawn curve for the absolute velocity in FIG. 3. An alternative possibility resides in controlling the absolute value of the crossflow velocity according to the broken line curve v' which, after the first flow direction reversal, is thus lower. This lower velocity is adequate as a rule because, due to the aforesaid integrated backwash procedure, the membrane has been cleaned at least partly and the flux rate can be kept at a high level in spite of the somewhat lower velocity.

After having passed through at least the second and preferably the fourth maximum and-lowering of the transmembrane pressure, the filtration is interrupted and in the following brief filtration interval or pause I, the covering layer is removed from the membrane. For this purpose the filter module 4 is emptied and is separated from the remaining plant by closing the valves 19, 20 and 21. Circulation of the beer in the plant is still maintained, e.g. by closing the valves 16 and 17 and opening the valves 15 and 18. This serves in particular the purpose of maintaining the temperature of the beer at the filtration temperature of about 0° C. The filtration plant will thus not be cleaned; rather, the filtration process will merely be momentarily interrupted in order to release the covering layer.

The filter module is now filled with 0,2 to 5% caustic soda whilst the valves 19, 20 and 21 on the filtrate side are closed, by way of the connection 34 via the valves 33 and 32 as well as the duct 31. Thereafter the caustic soda is forced through the membrane by replacement with water from the water connection 36. This causes partial chemical dissolution of the covering layer on the non-filtrate side of the membrane or its bond on the membrane, so that in particular the gel-like substances present in the membrane pores are at least partly chemically dissolved. The discharged caustic soda may subsequently be recovered and used for further rinsing procedures. The partly dissolved covering layer is mechanically forced away from the membrane almost entirely and the membrane is rinsed by a subsequent backwashing of the membrane with water from the filtrate towards the non-filtrate side.

This partially dissolving of the covering layer with the caustic liquor lasts as a rule barely between 45 seconds and two minutes, preferably one minute, backwashing with water about two to twenty minutes, preferably three to six minutes, these values depending of course on the size of the membrane filter. In any event, these times are substantially shorter than the duration of the actual filtration phases between the intervals and also the duration of the actual conventional cleaning phase after completion of the filtration phase. These kinds of cleaning phases last up to two hours and involve a plurality of steps, as is decribed for example in the aforementioned literature source *Ripperger, Microfiltration with membranes*, page 250, or EP-A-351, 363. During this filtration interval it is possible to carry out in addition a neutralising phase in that the filter module is briefly rinsed with an acid, e.g. nitric acid havimg a pH value between 2 and 3. If other beverages such as fruit juices are filtered, a cleaning liquid must be selected that, if required, dissolves covering layers that are of different compositions. Caustic liquors have been likewise proven in the case of fruit juices.

After complete or at any rate substantial removal of the covering layer from the membrane, the filter module is emptied once again, e.g. by being forced empty with the aid of $CO_2$, whereafter the next following filtration phase is carried out. Such a filtration process can, with the filtration plant described, last up to 120 hours. The plant is subsequently completely cleaned and rinsed through with cleaning agent in the way described.

Figure 4:
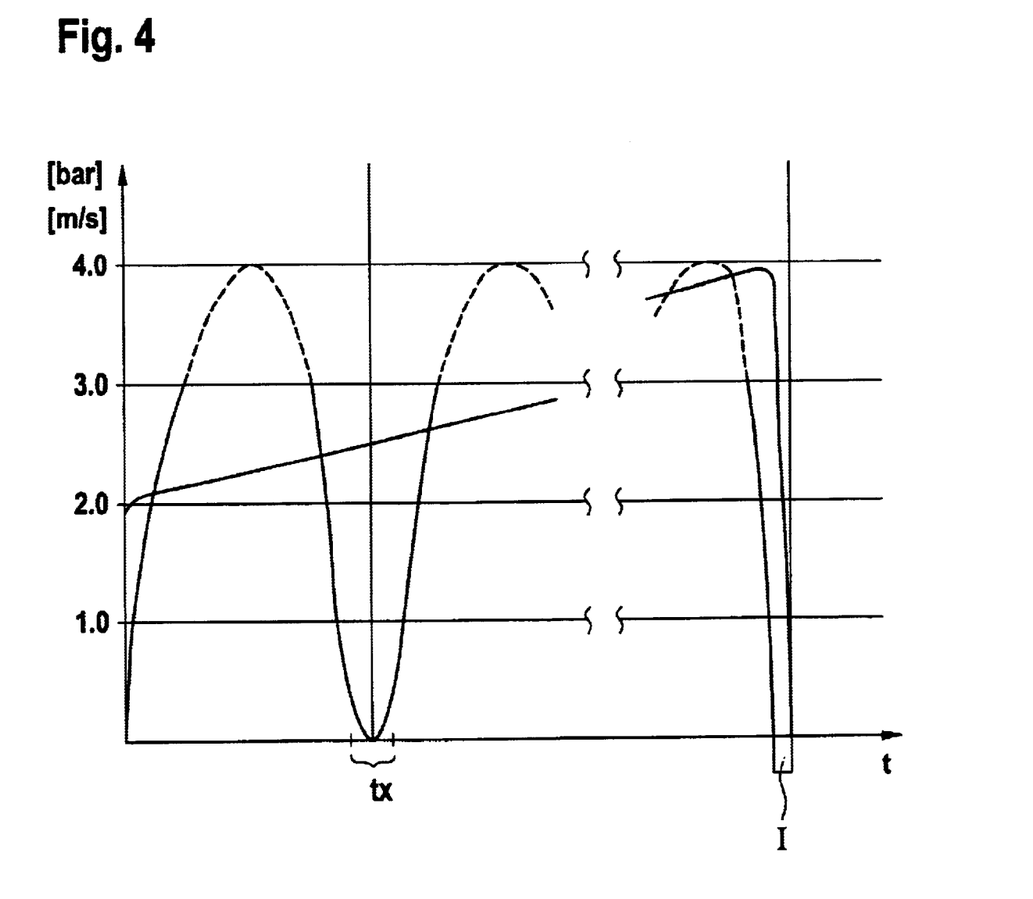
FIG. 4 a graph depicting a modified control of the transmembrane pressure and the crossflow velocity.

FIG. 4 illustrates schematically a time diagram for a filtration process controlled in a modified fashion. The time function for the transmembrane pressure is again similar to a sinus function having its actual maximum at about 4 bar, the amplitude, however, being cut off at about 3 bar and maintained at that level up to the intersection with the sinus drawn in broken lines, resulting in a plateau at a relatively high pressure level. The crossflow velocity which once again is plotted in absolute terms is raised during the filtration phase from about 2 m/s to about 4 m/s, the flow direction being reversed in the same manner as described above approximately every 30 minutes at $T_x$. The intermediate cleaning of the membrane takes place in the interval I, at the earliest after the second pressure plateau. However, it is also possible in the same manner as above for a plurality of cycles to be traversed. Although, as is known, the covering layer will grow heavily and become compressed at high pressures due to the high flux which is then attained causing a substantial drop of the effectiveness of the filtration in the longer term, this effect can be counteracted by the expedients proposed in accordance with the invention so that a high mean flux rate is attained.

In the filtration runs described and illustrated in FIGS. 3 and 4 the individual procedures are repeated essentially periodically. However, it is quite possible that, for example, the amplitude and period of the transmembrane pressure may change with time; the control of the amplitude and the pressure is then effected on the basis of the parameters measured by means of the sensors. However, as a rule, the periodicity can be maintained over long durations which is an advantage with the programming and automatising of the filtration process.

Figure 5:
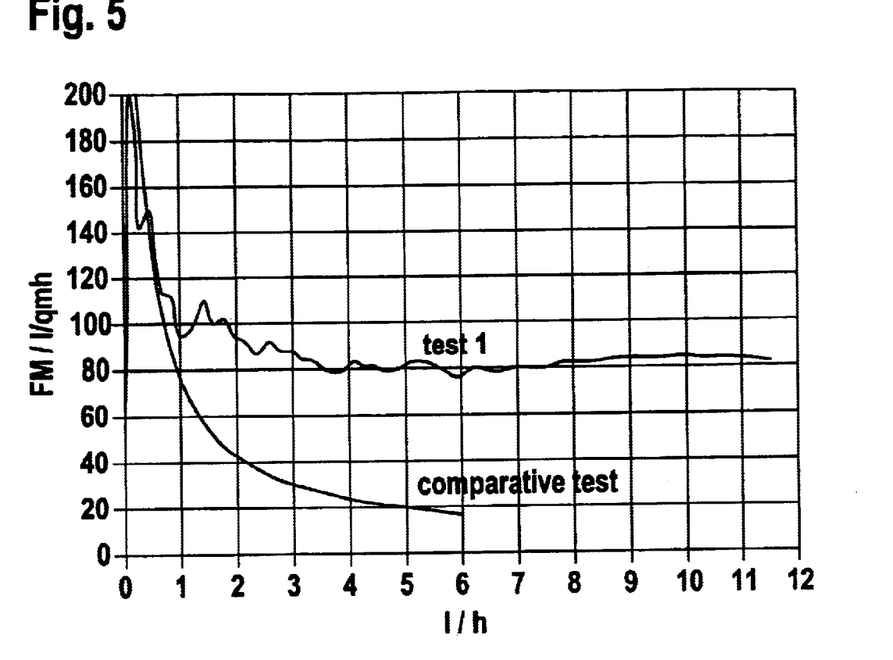
FIG. 5 a time diagram of the mean flux rate as a function of the time for a filtration test carried out in accordance with the invention and an associated comparative test.
Figure 6:
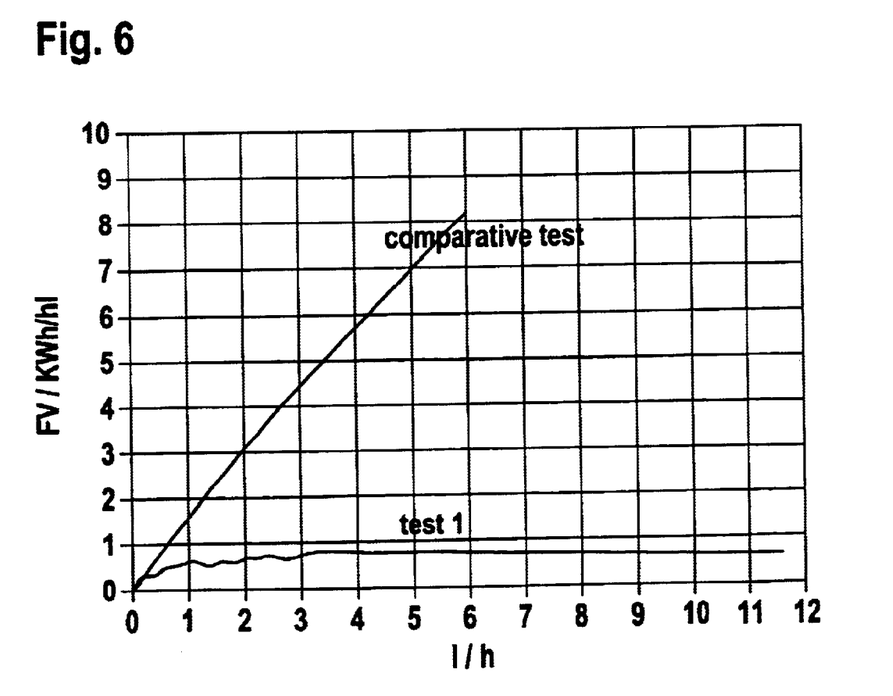
FIG. 6 the specific energy input as a function of time for the test according to the invention and the associated comparative test according to FIG. 5.

A decisive factor in the described filtration process is that an approximately constant mean flux rate and also an approximately constant mean energy requirement over time results; cf. in this context FIGS. 5 and 6.

FIGS. 5 and 6 illustrate data for a filtration according to the invention, corresponding to the control of pressure and crossflow velocity (process 1) explained in the context of FIG. 3 and for a comparative experiment in which the crossflow velocity was set to 6 m/s and the transmembrane pressure to 1,5 bar.

It is seen that according to the invention after an adjustment period a mean constant flux rate of about 80 litres per square meter filter area and hour is set up which can be maintained over many hours. Although this test was broken off after about 12 hours the filtration could have been maintained much longer without any substantial change in the results. In a demonstration plant, tests were run without problems for durations of more than 20 hours.

In contrast thereto, the flux rate in the comparative test drops to about 40 litres per square meter and hour after a mere 2 hours, and after six hours to less than 20 litres per square meter and hour, whereafter this test was discontinued.

However, a further decisive advantage of the filtration according to the invention is the low energy requirement; whereas according to the invention a substantially constant mean energy requirement of about 0,7 kilowatt hours per hectolitre was required, the energy requirement for the comparative test rose continuously to about 7 kilowatt hours per hectolitre after six hours. From this it is clear that the cross flow microfiltration conducted in accordance with the invention can also be employed economically for the clarification of beer.

In the working examples described, a transmembrane pressure was controlled essentially by varying the two gas cushions G1 and G2. However, the control of the pressure may also proceed differently, e.g. with the aid of a pump as illustrated schematically in FIG. 7.

Figure 7:
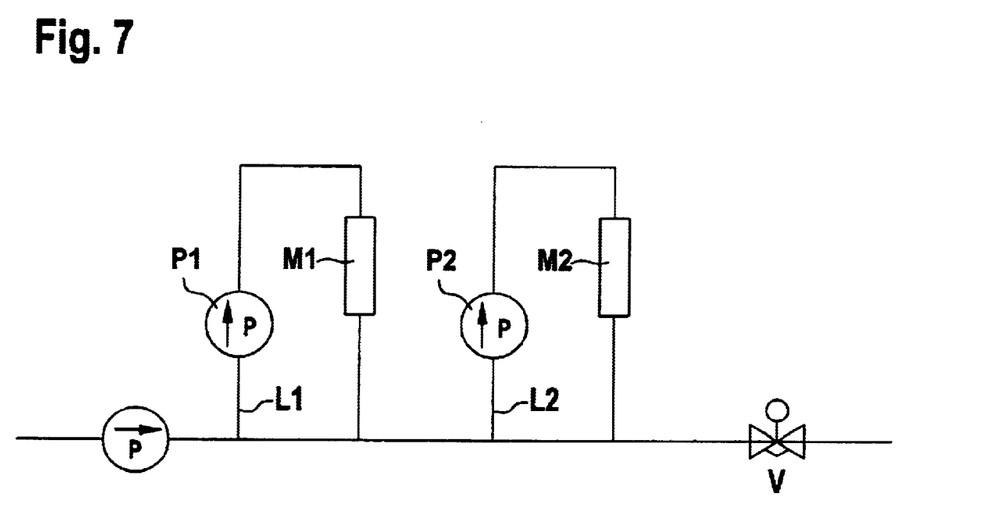
FIG. 7 an arrangement of the pump and several filter modules for a modified experimental plant.

In FIG. 7, P denotes a feed pump for the entire membrane filter plant. It draws the beer to be filtered from the storage tank which has not been illustrated here and conveys it through the pressure maintenance valve V either—in so-called batch operation—back to the storage tank or—in continuous operation—into a collecting vessel for concentrated beer. The pressure maintenance valve V can now be opened or closed continuously so that the pressure in the feed line can be set to the desired value, being the input pressure applied to the individual filter modules. In order to vary the pressure, the rate of rotation of the feed pump may be varied in addition.

A plurality of, in the present case two ducts L1 and L2 branch off from the feed duct, each leading to a pump P1 and P2 respectively and from there to a module M1 and M2 respectively and back to the feed duct. These pumps P1 and P2 convey the beer through the module and back again into the feed duct. The arrangement can obviously be further extended by additional filter modules.

In FIG. 7 the heat exchangers, sensors etc. are not shown.

In a demonstration plant, crossflow velocity values between 0,2 and 15 meter per second, preferably between 0,5 and 8 meters per second and for the transmembrane pressure values up to 6 bar were used. The membranes had pore diameters between 0,1 and 2,0 micrometer, preferably between 0,2 and 1,0 micrometer. The temperature of the beer for the filtration was set to about 0° C.

Filtrations were also carried out with a control system which differed from the one described, namely:

- periodic and partial dissolving of the covering layer and mechanical removal by subsequent water backwashing at constantly maintained pressure and constant crossflow velocity with and without flow direction reversal;
- periodic and partial dissolving of the covering layer with subsequent water backwash at constant transmembrane pressure and increasing crossflow velocity, likewise with and without flow direction reversal;
- periodic and partial dissolving of the covering layer with subsequent water backwash at varying transmembrane pressure and constant crossflow velocity, likewise with and without reversal of flow direction.

For the pressure control, other varying time functions with alternating maxima and minima were also used, in particular sawtooth and triangular-like time functions. Furthermore, in a velocity control in the first filtration phase, the crossflow velocity in the subsequent filtration phases was kept essentially constant at a relatively high level.

Also these modifications, and in particular the abovementioned second and third modification, yielded good results with regard to flux rate and energy requirement. The combination of the above in conjunction with the steps described in FIGS. 3 and 4 was found, however, to be the one most effective for the filtration, in other words:

- varying the transmembrane pressure according to an essentially periodic sinusoidal time function with integrated backwash;
- essentially continuous increase of the flow velocity at least during the first filtration phase;
- and partial dissolving of the covering layer with caustic soda and backwashing of the membrane with water after each filtration phase.

Inasmuch as the invention is subject to modifications and variations, the foregoing description and accompanying drawings should not be regarded as limiting the invention, which is defined by the following claims and various combinations thereof:

What is claimed is:

1. A method for raising the filtrate throughput in a crossflow membrane filter in a filter module of a filtration plant during the filtration of beer by releasing a covering layer built up on a filter membrane from the filter membrane, wherein beer is passed through the filter membrane from an unfiltrate side of the membrane to a filtrate side of the membrane thereby building up a cake of materials on the unfiltrate side of the membrane and thereby creating a transmembrane pressure over the filter membrane, the method comprising the steps of a) interrupting the flow of beer through the filter membrane;
   b) separating the filter module from the filtration plant;
   c) removing the beer from the filter module while maintaining circulation of the beer in the plant;
   d) introducing into the filter module an agent for dissolving chemical bonds between the cake of materials and the membrane;
   e) maintaining said agent within the filter module in a concentration, at a temperature and for a time sufficient to loosen the cake of materials from the membrane without completely dissolving the cake of materials;
   f) back flushing the membrane with a rinsing liquid from the filtrate side to the unfiltrate side of the membrane to remove the cake of materials from the membrane and into the filter module;
   g) removing the cake of materials from the filter module;
   h) connecting the filter module with the filtration plant;
   i) resuming the flow of beer through the filter membrane; and
   j) repeating steps a) to i) in the same filtration run.

2. A method according to claim 1, wherein the rinsing liquid is water.

3. A method according to claim 1, wherein the maintaining time in step e) is between approximately 45 seconds and two minutes.

4. A method according to claim 1, wherein the rinsing in step f) lasts from two minutes to twenty minutes.

5. A method according to claim 4, wherein the maintaining time is forty-five seconds to two minutes.

6. A method according to claim 1, comprising a further step of varying the transmembrane pressure periodically between a maximum pressure and a minimum pressure, said minimum being so adjusted that, during a filtration interval, at least a part of the membrane is subjected to flow through from the filtrate to the unfiltrate side and thus subjected to integrated back flushing and cleaning, and the releasing of the covering layer from the filter module commences at the earliest after a second maximum of the transmembrane pressure.

7. A method according to claim 6, wherein the beer is periodically caused to flow in a reverse direction over the membrane during said filtration interval.

8. A method according claim 6, wherein the agent in step d) is caustic soda.

* * * * *